United States Patent
Baglin

(10) Patent No.: US 7,272,749 B2
(45) Date of Patent: Sep. 18, 2007

(54) SERVER'S FUNCTION BOARD MAINTENANCE

(75) Inventor: Vincent Baglin, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 521 days.

(21) Appl. No.: 10/841,506

(22) Filed: May 10, 2004

(65) Prior Publication Data

US 2005/0262380 A1    Nov. 24, 2005

(51) Int. Cl.
  *G06F 11/00*    (2006.01)
(52) U.S. Cl. ......................................................... 714/24
(58) Field of Classification Search ................... 714/24
    See application file for complete search history.

(56) References Cited

U.S. PATENT DOCUMENTS

| | | | |
|---|---|---|---|
| 5,784,576 A * | 7/1998 | Guthrie et al. .............. | 710/302 |
| 6,041,375 A * | 3/2000 | Bass et al. .................. | 710/302 |
| 7,137,011 B1 * | 11/2006 | Harari et al. ................ | 713/189 |
| 2003/0135767 A1 * | 7/2003 | Chu et al. .................... | 713/300 |
| 2004/0059862 A1 * | 3/2004 | Chan .......................... | 710/316 |
| 2005/0195075 A1 * | 9/2005 | McGraw et al. ............. | 340/500 |

* cited by examiner

*Primary Examiner*—Michael Maskulinski

(57) ABSTRACT

A method, a management node and a server for maintaining the server, which comprises a plurality of function boards, comprising steps and capabilities for receiving at the server a shutdown request comprising an identifier of at least one function board from the plurality of function boards, prior to executing the shutdown of the at least one function board, identifying at least one service associated with the at least one function board and sending a service notification comprising an identifier of the at least one service associated with the at least one function board. Further steps and capabilities are included for receiving a decision notification comprising one of a shutdown decision and a cancel shutdown decision, the shutdown decision and the cancel shutdown decision being taken considering the sent service notification and, if the decision notification comprises the decision to shutdown, shutting down the at least one function board.

17 Claims, 2 Drawing Sheets

SERVER'S FUNCTION BOARD MAINTENANCE

BACKGROUND OF THE INVENTION

1. Field of the Invention

The present invention relates to maintenance of function boards located in a remote server system.

2. Description of the Related Art

The majority of today's computers include multiple cards or boards each having specific functionalities. Those boards may, for example, provide network connectivity of the computer or provide a display interface. Depending on the computer's architecture, each board can either be permanently fixed or can be removed and replaced. Within the computer, communication within boards is usually performed through a data bus having known characteristics. Those characteristics may be standardized and apply to all the industry (PCI, AGP, etc.) or may be specific to a given computer maker (proprietary interface). Characteristics also vary depending on the nature of the functionalities provided by a board and its fixed or removable nature.

In computers having server capabilities, maintenance of the boards is of great importance since functionalities of the server are linked to the proper working of the boards. A lot of efforts are spent to minimize the impact of maintenance on services provided by the servers. The goal is always to obtain the highest possible availability for all services provided thereby. In order to save time, it is possible, for instance, to shutdown only one board of a server computer and to repair or replace it with another board without having to reset the server. Examples of situations where such an approach is desirable include solving erratic failures from a board cyclically generating alarms, upgrading a board's hardware or software and performing tests on a board.

However, there is no known way of identifying the effects of a board shutdown, or other critical maintenance activity, on the services currently provided by the server. Thus, it is not possible to evaluate the consequences of a given maintenance task beforehand. It would be convenient to obtain the activity status of a board in relation with services provided by the server to be able to predict the effects of a maintenance activity from a service provider perspective. The present invention answers such a need.

SUMMARY OF THE INVENTION

A first aspect of the present invention is directed to a method for maintaining a server, wherein the server comprises a plurality of function boards. The method comprises steps of receiving at the server a shutdown request comprising an identifier of at least one function board from the plurality of function boards and, prior to executing the shutdown of the at least one function board, identifying at least one service associated with the at least one function board and sending a service notification comprising an identifier of the at least one service associated with the at least one function board. The method also comprises steps of receiving a decision notification comprising one of a shutdown decision and a cancel shutdown decision, the shutdown decision and the cancel shutdown decision being taken considering the sent service notification and, if the decision notification comprises the decision to shutdown, shutting down the at least one function board.

A second aspect of the present invention is directed to a server within a communications network, the server comprising a plurality of function boards, each function board providing at least one service. The server comprises an incoming communication module, a diagnostic module and a hardware management module. The incoming communication module of the server is capable of receiving a shutdown request comprising an identifier of at least one function board from the plurality of function boards and receiving a decision notification comprising one of a shutdown decision and a cancel shutdown decision. The diagnostic module of the server is capable of identifying which of the at least one service is associated with the at least one function board identified in the shutdown request and building and sending a service notification upon reception of the shutdown request, the service notification comprising an identifier of the at least one service associated with the at least one function board, wherein the shutdown decision and the cancel shutdown decision of the decision notification are taken considering the sent service notification. The hardware management module of the server is capable of shutting down the at least one function board identified in the shutdown request if the decision notification comprises the shutdown decision.

A third aspect of the present invention is directed to a management node within a communications network for managing maintenance of a remote server comprising a plurality of function boards. The management node comprises a Graphical User Interface (GUI) and a maintenance module. The GUI of the management node is capable of managing interactions with a user of the management node, wherein the interactions' nature is one of remote and local. The maintenance module of the management node is capable of receiving a request from the user, via the GUI, to maintain at least one function board of the remote server and sending a shutdown request to the remote server, the shutdown request comprising an identifier of the at least one function board from the plurality of function boards. The maintenance module is also capable of receiving a service notification from the remote server, the service notification comprising an identifier of at least one service associated with the at least one function board, taking a decision on shutdown of the at least one function board based on the criticalness of the at least one service and, if the decision is to shutdown the at least one function board, sending a decision notification comprising a shutdown decision to the remote server.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

The present invention aims at reducing the negative impacts of maintenance activities on services provided by a server. For services of the server provided via function boards, maintenance activities usually require that the function boards be shutdown (or taken offline, which has the same effect) in order to proceed with the maintenance activities. In such cases, it is desirable to obtain an activity status of the affected function boards beforehand to be able to predict the effects of the maintenance activities. The present invention provides a mechanism possibly involving interactions between the server and a management node wherein information on services provided by a function board to be shutdown are sent to the management node following reception of an appropriate request therefrom. A human operator or an expert system at the management node can then appropriately decide, probably considering other information available in the management node, to continue the maintenance activity or to gracefully cancel it.

Figure 1:
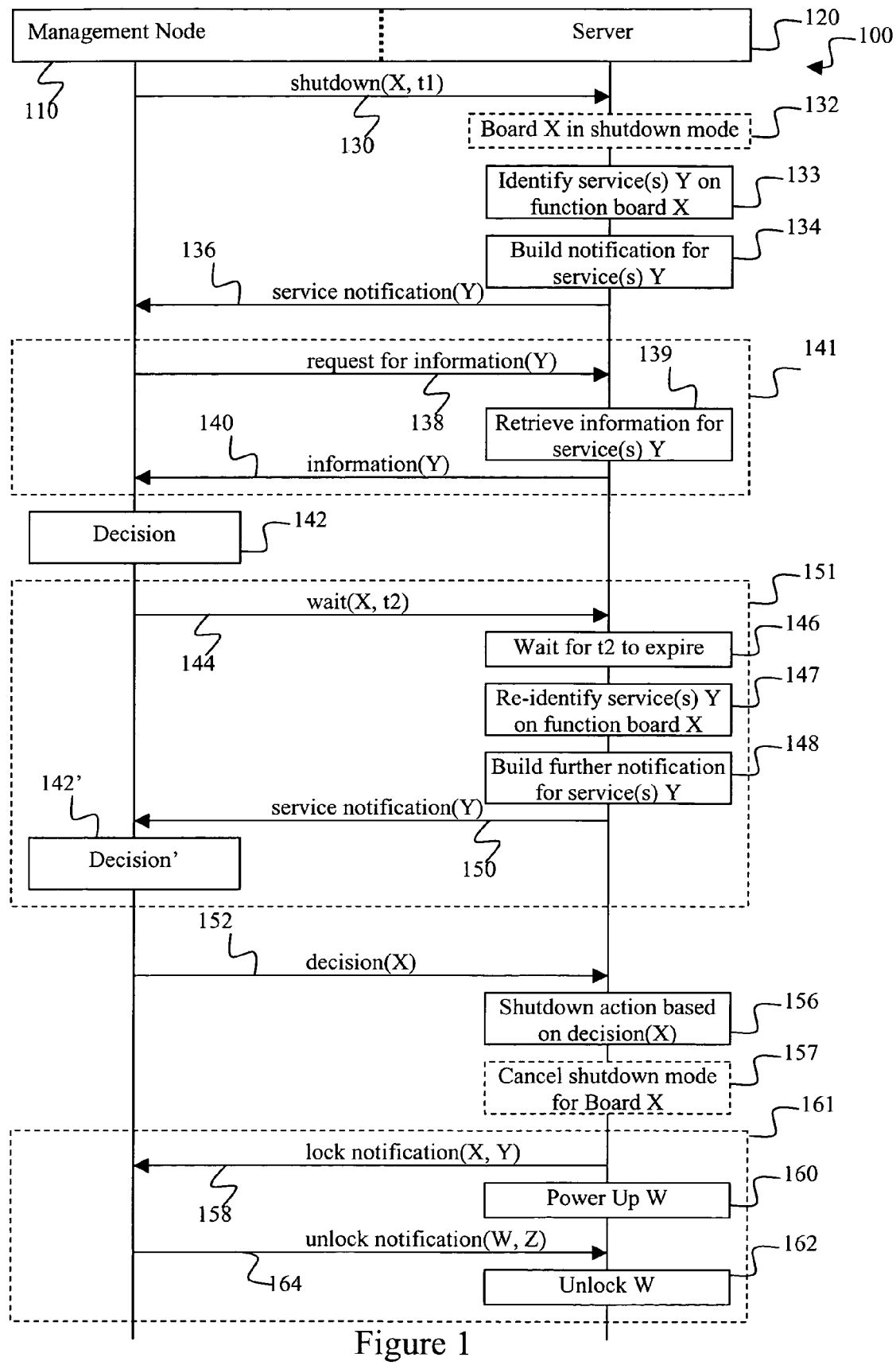
FIG. 1 is an exemplary signal flow and nodal operation chart for maintaining a server comprising a plurality of function boards in accordance with the present invention.

Reference is now made to the drawings where FIG. 1 shows an exemplary signal flow and nodal operation chart for maintaining a server 120 in a communications network 100. FIG. 1 shows the server 120 and a management node 110, which can be remotely located and network connected through various networks equipments with the server 120, located locally and connected directly with the server 120 or collocated with the sever 120. In cases where the server 120 and the management node 110 need to communicate over the network 100, various protocols of communication (IP over Ethernet, SS7 on ATM, etc.) may be used without affecting the present invention. In the same way, the structure of the messages exchanged between the server 120 and the management node 110 may be standardized (e.g. Simple Network Management Protocol) or be at least partly proprietary to the server's 120 and management node's 110 manufacturer.

The server 120 comprises a plurality of function boards (not shown on FIG. 1), each of which is capable of providing at least one service. The invention can be applied, as an example, to a specific application of Base Station Controller (BSC) where different types of function boards or Field Replaceable Units (FRU) are used such as, for example, interface boards providing network connectivity services, timing boards providing synchron ization services, switch boards providing traffic switching services, general purpose processor boards and special purpose processor boards respectively providing general and specific server related services and media stream boards providing media streaming services. Of course, it should be understood that the BSC is only an example of server 120 having a function board architecture and that the examples of services that can be used thereon are shown only to better demonstrate the functioning of the present invention.

In a first embodiment of the present invention shown in FIG. 1, a method is provided for maintaining at least one function board of the plurality of function boards of the server 120. The method comprises a step 130 of receiving at the server 120 a shutdown request comprising an identifier of the at least one function board. The request to shutdown is usually sent from the management node 110, in which the function board was selected for maintenance. For example, selection of the function board can be made via a Graphical User Interface (GUI) (not shown on FIG. 1) of the management node 110 showing the architecture of the server 120.

Further to the identifier of the at least one function board, the request may comprise a timer value t1. The timer value represents the minimum amount of time after which the at least one function board could be shutdown. The shutdown, however, only occurs if other conditions presented below are also respected. The timer value can be further adjusted in the GUI of the management node 110 before being sent in the request to shutdown of the step 130.

Upon reception of the shutdown request in the step 130, optionally, the server 120 may place the at least one function board in a shutdown mode (step 132). The shutdown mode allows all current tasks to be handled normally, but forbids new tasks to be accepted by the at least one function board. The shutdown mode is useful in combination with the timer value for specific examples where the life cycle of the tasks can be predicted. In such cases, it allows the function board to free itself seamlessly while, presumably, another function board handles the new requests not accepted by the function board to be shutdown. The step 132 is shown on FIG. 1 immediately following the step 130, but, depending on the type of function boards and associated service; it could be executed at any time after reception of the request of the step 130. The box of the step 132 is shown in dashed line on FIG. 1 to show its optional nature and optional position in the method of this embodiment of the present invention.

Prior to executing the shutdown of the at least one function board, the method comprises a step 133 of identifying at least one service associated with the at least one function board. The identification of the at least one service can be done, for instance, by identifying at least one application that is using resources of the at least one function board and then by associating the at least one application to the at least one service. Further to the identification, a service notification comprising an identifier of the at least one service associated with the at least one function board is built in step 134 before being sent in step 136 to the management node 110.

At this point, the management node 110 receives the service notification in step 136 and may have access to other information concerning the server 120 from, for instance, SNMP (or MIB) databases. The information at hand in the server 120 may allow a human operator of the management node 110 or an expert system (not shown) to take an appropriate decision (step 142) on whether or not a shutdown decision or a cancel shutdown decision should be taken. The decision of step 142 can include an evaluation of criticalness of the at least one service associated with the at least one function board. The criticalness, in such cases, is evaluated in view of various criterions associated with the at least one service. Of course, it should be understood that the scope of this invention does not encompass the criterions used to take the decision, but rather the possibility that a decision based on such criterions could be taken before shutting down the function board. Nevertheless an exemplary list of criterions includes number of users associated with the at least one service, interactions of the at least one service with other services of the server 120 or of the communications network 100, anticipated loss of revenue for the owner of server 120, etc. In some situations, optionally, the human operator of the management node 110 or the expert system may not have enough information to take the decision of step 142. If so, a request for information (step 138) concerning the at least one service associated with the at least one function board is sent from the management node 110 to the server 120. The server 120 then retrieves relevant information contained therein concerning the at least one service (step 139) such as, for example, the number of network ports opened for the at least one service on the at least one function board. The server 120 further replies at step 140 with an information reply built from the retrieved information. The steps 138 to 140 are shown in a dashed box 141 in FIG. 1 to show their optional nature in the present invention.

Further to the reception of the service notification of step 136, the decision 142 may optionally consist of a postpone decision if the human operator or the expert system at the management node 110, for any reason, requires more time or would like to wait before taking a final decision. If such is the case, a wait request comprising the identifier of the at least one function board and a wait timer value t2 is built by the management node 110 and is sent (step 144) to the server 120. The server 120 then, in turn, waits for the wait timer value to expire (step 146), re-identifies the at least one service associated with the at least one function board (step 148) and sends a further service notification (step 150) containing the identifier of the at least one service associated with the at least one function board. The wait request of step 144 can be a further shutdown request, replacing or refreshing the shutdown request of step 130. The further shutdown request, in the present example of step 144, contains the timer value t2. Further to the step 150, the human operator or expert system takes a further decision 142' in the same way the decision 142 was previously taken. Likewise, the decision 142' may be to postpone the decision or to request further information (steps 141). The steps 144 to 150 and 142' are shown in a dashed box 151 in FIG. 1 to show their optional nature in the present invention and also to illustrate the possibility for those steps 151 to repeat themselves as many times as necessary as long as the decision 142' is to postpone the final decision.

No matter how many times the steps 151 and steps 141 are repeated, or even if they are not performed at all, a decision to shutdown or a decision to cancel shutdown must be taken by the human operator or the expert system sooner or later (step 142 or 142'). Once taken, the decision to shutdown or the decision to cancel shutdown is sent to the server 120 in a decision notification (step 152). Likewise, the server 120 receives the decision notification of step 152 and, if the decision notification comprises the decision to shutdown, shuts down the at least one function board (step 156) already identified by the identifier in the request to shutdown of step 130. However, if the optional timer value was included in the shutdown request of step 130 and if the decision notification comprises a shutdown decision, then the step 156 of shutting down the at least one function board may be executed only after expiration of the timer value of the shutdown request of step 130. The decision notification of step 152 can be of different natures depending on the taken decision of step 142 or 142'. For instance, the decision notification of step 152 comprising the decision to shutdown the function board can be a lock notification comprising the identifier of the function board to be shutdown, in which case all tasks running on the at least one function board are terminated and the board is shutdown. Likewise, the decision notification of step 152 comprising the decision to cancel shutdown the function board can be an unlock notification comprising the identifier of the function board not to be shutdown.

In a further optional behavior wherein the shutdown request of step 130 comprises the timer value t1, the shutdown of the at least one function board may occur upon expiration of the timer value t1 unless a cancel shutdown decision is received in the decision of step 142 or 142' before the expiration of the time value t1. Likewise, if the wait request of step 144 comprises the timer value t2, the shutdown of the at least one function board may occur upon expiration of the timer value t2 unless a cancel shutdown decision is received in the decision of step 142 or 142' before the expiration of the time value t2.

As mentioned earlier, the step 132 of placing the function board in a shutdown mode can be performed at any time between the reception of the shutdown request of step 130 up to after the reception of the decision notification of step 152. If the board was put in shutdown mode in the step 132 and a cancel shutdown decision is received in the decision notification of step 152, then a step 157 of canceling the shutdown mode for the function board needs to take place. The step 157 of canceling the shutdown mode for the function board is shown on FIG. 1 in a dashed box to emphasize its optional nature due to its link to the optional step 132. However, if the board was put in shutdown mode in the step 132 and a shutdown decision is received in the decision notification of step 152, then there is no need to cancel the shutdown mode for the function board.

In all cases where a shutdown decision is received in the decision notification of step 152, it is an optional behavior to send a lock notification (step 158) from the server 120 to the management node 110. The lock notification of the step 158 shows that the function board is going offline from this point on. The lock notification of the step 158 comprises the identifier of the at least one function board and the identifier of the at least one service.

Other optional steps are also depicted on FIG. 1 when a new function board (or a modified version to the shutdown function board) is placed in the server 120 and powered up (step 160). Following the power up of the step 160, an unlock notification needs to be received in the server 120 from the management node 110 (step 162). The unlock notification of step 164 includes at least an identifier of the new function board and could also comprise an identifier of at least one service to be provided by the new function board. Following reception of the unlock notification, the new function board is placed in an unlock mode (step 164) or complete operation mode. The steps 158 to 164 are shown in a dashed box 161 in FIG. 1 to show their optional nature in the present invention.

Figure 2:
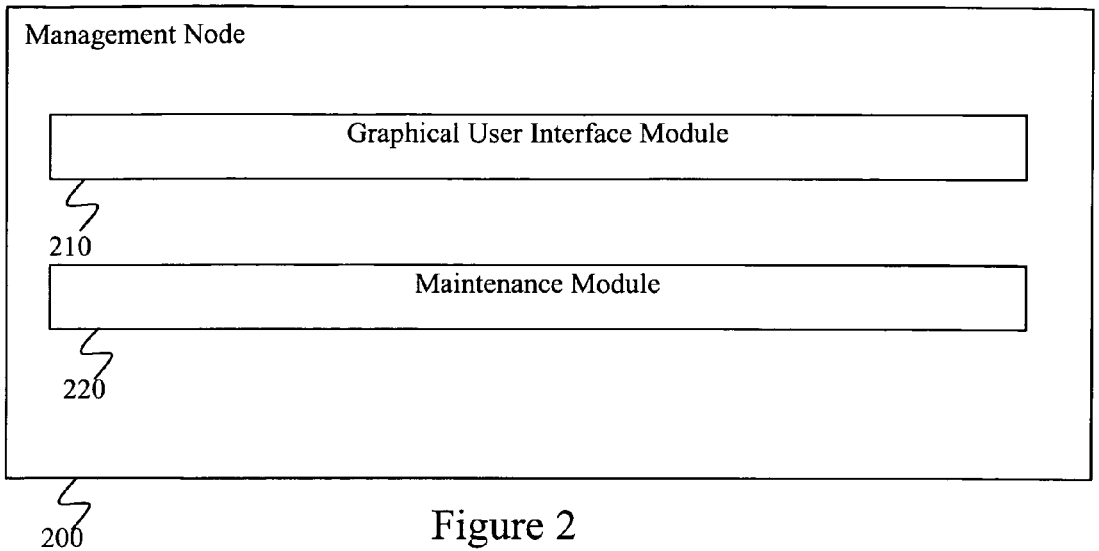
FIG. 2 is an exemplary modular representation of a management node for managing maintenance of a remote server comprising a plurality of function boards in accordance with the present invention.

Reference is now made to FIG. 2, which shows an exemplary modular representation of a management node 200 within a communications network (not shown on FIG. 2) for managing maintenance of a remote server (not shown on FIG. 2). The remote server comprises a plurality of function boards in accordance with the present invention. The management node 200 comprises a Graphical User Interface (GUI) 210 and a maintenance module 220.

The GUI 210 is capable of managing interactions with a user of the management node 200. Since the management node 200 can be accessed locally or remotely, the interactions with the user thereof can be of a remote or local nature.

The maintenance module 220 of the management node 200 is capable of handling multiple tasks in relation with the maintenance of at least one of the remote server's function boards. The maintenance module 220 is capable of receiving a request from the user, via the GUI, to maintain at least one function board of the remote server. From the request, the maintenance module 220 is capable of sending a shutdown request to the remote server in which an identifier of the at least one function board from the plurality of function boards is included. Further to this shutdown request, the maintenance module 220 receives a service notification from the remote server comprising an identifier of at least one service associated with the at least one function board. With the service notification available, the maintenance module 220 is capable of taking a decision as to whether or not the at least one function board is to be shutdown based on, among other things, the criticalness of the at least one service. In order to take the decision, the maintenance module 220 may further interact with an expert system collocated with the management node 200 or remote thereto. If the decision is to shutdown the at least one function board, the maintenance module 220 is further capable of sending a decision notification comprising a shutdown decision to the remote server. As mentioned earlier, the scope of this invention does not encompass the criterions used to take the decision, but rather the possibility that a decision based on such criterions could be taken before shutting down the function board In an optional embodiment of the present invention, the maintenance module 220 is further capable of sending, after reception of the service notification, an information request to the remote server concerning the at least one service associated with the at least one function board. In such a case, the management module 220 needs to wait for an information reply from the remote server containing further information found in the remote server about the at least one service before taking the decision. This is particularly useful when the service notification does not contain enough information to appropriately take the decision.

It is another optional behavior for the maintenance module 220 of the management node 200, after reception of the service notification, to send a wait request to the remote server with a timer value and to wait for a further service notification before taking the decision.

Figure 3:
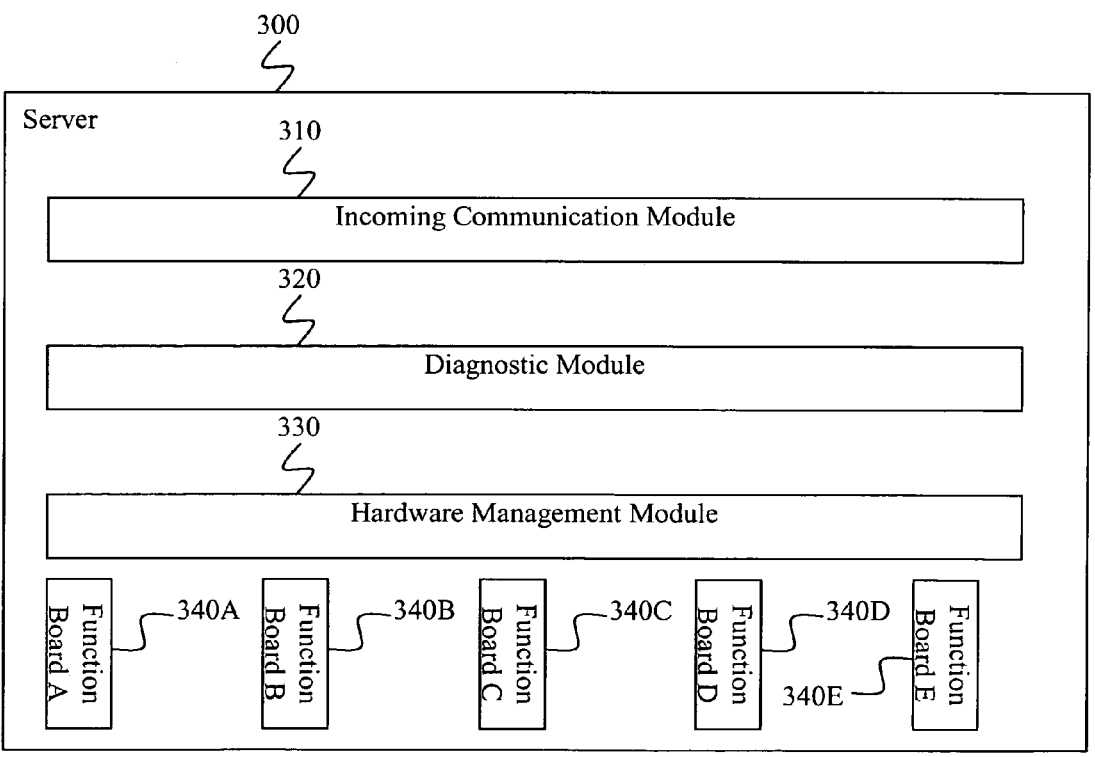
FIG. 3 is an exemplary modular representation of a server comprising a plurality of function boards wherein each function board provides at least one service in accordance with the present invention.

Reference is now made to FIG. 3, which shows an exemplary modular representation of the server 300. The server 300 comprises a plurality of function boards 340A-E and each function board 340A-E provides at least one service. The server 300 further comprises an incoming communication module 310 capable of receiving various types of requests, a diagnostic module 320 capable of analyzing the current activities of the server 300 and a hardware management module 330 capable of managing the hardware portion of the sever 300, including the function boards 340A-E.

More precisely, the incoming communication module 310 is capable of receiving a shutdown request comprising an identifier of at least one function board, for instance 340C, from the plurality of function boards 340A-E and of receiving a decision notification comprising one of a shutdown decision and a cancel shutdown decision.

The diagnostic module 320 is capable of identifying which of the at least one service is associated with the at least one function board 340C identified in the shutdown request and of building and sending a service notification, upon reception of the shutdown request. The service notification comprises an identifier of the at least one service associated with the at least one function board 340C, wherein the shutdown decision and the cancel shutdown decision of the decision notification are taken considering the sent service notification.

The hardware management module 330 is capable of shutting down the at least one function board 340C identified in the shutdown request if the decision notification comprises the shutdown decision.

Optionally, the hardware management module 330 is further capable of placing, upon reception of the shutdown request, the at least one function board 340C in a shutdown mode in which current tasks of the at least one function board 340C are handled normally and in which no new tasks are accepted by the at least one function board 340C. Likewise, the hardware management module 330 may further be capable of placing the at least one function board in an unlock mode if the decision notification comprises the cancel shutdown decision.

Furthermore, the incoming communication module 310 may further be capable of receiving a timer value within the shutdown request. In such a scenario, the hardware management module 330 need to be further capable of waiting for expiration of the timer value before shutting down the at least one function board.

The incoming communication module may further be capable of receiving a request for information concerning the at least one service associated with the at least one function board 340C. The diagnostic module 320 then needs to have further capabilities to send an information reply with information contained in the server concerning the at least one service associated with the at least one function board 340C.

In another optional embodiment of the server 300, the incoming communication module 310 is further capable of receiving a wait request comprising a timer value after sending the service notification in which case the diagnostic module is further capable of waiting for the timer value to expire before re-identifying the at least one service associated with the at least one function board and sending a further service notification containing an identifier of the at least one service associated with the at least one function board.

The hardware management module 330 may further be capable of sending a lock notification comprising the identifier of the at least one function board and the identifier of the at least one service following reception of the decision notification comprising the shutdown decision.

Although several preferred embodiments the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the present invention. For instance, the management node 200 may comprise multiple nodes, local and remote to the server 300, interacting together and providing the functionalities described in the Detailed Description under the management node 200.

What is claimed is:

1. A method for maintaining a server, wherein the server comprises a plurality of function boards, the method comprising steps of:
    receiving at the server a shutdown request comprising an identifier corresponding to one of the plurality of function boards;
    prior to executing a shutdown of the at least one function board for which the identifier has been received:
        identifying at least one service associated with the at least one function board; and
        sending a service notification comprising an identifier of the at least one service associated with the at least one function board;
    receiving a decision notification comprising one of a shutdown decision and a cancel shutdown decision, the shutdown decision and the cancel shutdown decision being taken considering the sent service notification; and if the decision notification comprises the decision to shutdown, shutting down the at least one function board.

2. The method of claim 1 further comprising steps of:
after reception of the shutdown request, placing the at least one function board in a shutdown mode in which current tasks of the at least one function board are handled normally and in which no new tasks are accepted by the at least one function board; and
after reception of the decision notification, canceling the shutdown mode of the at least one function board if the decision notification comprises the cancel shutdown decision.

3. The method of claim 1, wherein:
the step of receiving a shutdown request further comprises a step of receiving at the server a timer value within the shutdown request; and
the step of shutting down the at least one function board further comprises a step of waiting for expiration of the timer value before shutting down the at least one function board.

4. The method of claim 1 further comprising steps of:
after sending the service notification, receiving a request for information concerning the at least one service associated with the at least one function board; and
sending an information reply with information contained in the server concerning the at least one service associated with the at least one function board.

5. The method of claim 1 further comprising steps of:
after sending the service notification, receiving a wait request comprising a timer value;
waiting for the timer value to expire;
re-identifying the at least one service associated with the at least one function board; and
sending a further service notification containing an identifier of the at least one service associated with the at least one function board.

6. The method of claim 1 wherein the step of shutting down the at least one function board further comprises sending a lock notification, the lock notification comprising the identifier of the at least one function board and the identifier of the at least one service.

7. The method of claim 1 further comprising steps of
receiving the service notification in a management node connected to the server;
evaluating criticalness of the at least one service associated with the at least one function board, wherein the criticalness is evaluated in view of various criterions associated with the at least one service;
building the decision notification with one of the shutdown decision and the cancel shutdown decision; and
sending the decision notification from the management node to the server.

8. A server within a communications network, the server comprising a plurality of function boards, each function board providing at least one service, the server comprising:
an incoming communication module capable of:
receiving a shutdown request comprising an identifier corresponding to at least one function board from the plurality of function boards; and
receiving a decision notification comprising one of a shutdown decision and a cancel shutdown decision;
a diagnostic module capable of:
identifying which of the at least one service is associated with the at least one function board identified in the shutdown request; and
building and sending a service notification upon reception of the shutdown request, the service notification comprising an identifier of the at least one service associated with the at least one function board, wherein the shutdown decision and the cancel shutdown decision of the decision notification are taken considering the sent service notification; and
a hardware management module capable of:
shutting down the at least one function board identified in the shutdown request if the decision notification comprises the shutdown decision.

9. The server of claim 8 wherein the hardware management module is further capable of:
placing the at least one function board in a shutdown mode in which current tasks of the at least one function board are handled normally and in which no new tasks are accepted by the at least one function board upon reception of the shutdown request; and
canceling the shutdown mode of the at least one function board if the decision notification comprises the cancel shutdown decision.

10. The server of claim 8, wherein:
the incoming communication module is further capable of receiving a timer value within the shutdown request; and
the hardware management module is further capable of waiting for expiration of the timer value before shutting down the at least one function board.

11. The server of claim 8 wherein the incoming communication module is further capable of receiving a request for information concerning the at least one service associated with the at least one function board and wherein the diagnostic module is further capable of sending an information reply with information contained in the server concerning the at least one service associated with the at least one function board.

12. The server of claim 8, wherein:
the incoming communication module is further capable of receiving a wait request comprising a timer value after sending the service notification; and
the diagnostic module is further capable of:
waiting for the timer value to expire;
re-identifying the at least one service associated with the at least one function board; and
sending a further service notification containing an identifier of the at least one service associated with the at least one function board.

13. The server of claim 8 wherein the hardware management module is further capable of:
sending a lock notification comprising the identifier of the at least one function board and the identifier of the at least one service following reception of the decision notification comprising the shutdown decision.

14. A management node for managing maintenance of a remote server comprising a plurality of function boards, the management node comprising:
a Graphical User Interface (GUI) capable of managing interactions with a user of the management node, wherein the interactions' nature is one of remote and local; and
a maintenance module capable of:
receiving a request from the user, via the GUI, to maintain at least one function board of the remote server;

sending a shutdown request to the remote server, the shutdown request comprising an identifier of the at least one function board from the plurality of function boards;

receiving a service notification from the remote server, the service notification comprising an identifier of at least one service associated with the at least one function board;

taking a decision on shutdown of the at least one function board based on the criticalness of the at least one service;

if the decision is to shutdown the at least one function board, sending a decision notification comprising a shutdown decision to the remote server.

15. The management node of claim 14 wherein the maintenance module is further capable of:

sending an information request to the remote server concerning the at least one service associated with the at least one function board; and waiting for an information reply from the remote server containing further information found in the remote server about the at least one service before taking the decision.

16. The management node of claim 14 wherein the maintenance module is further capable of:

sending a wait request to the remote server with a timer value; and waiting for a further service notification before taking the decision.

17. The management node of claim 14 wherein the maintenance module is further capable of:

interacting with an expert system before taking the decision, the expert system, being either collocated with the management node or remotely located.

* * * * *